(12) United States Patent
Orihara et al.

(10) Patent No.: US 9,781,236 B2
(45) Date of Patent: Oct. 3, 2017

(54) ELECTRONIC APPARATUS

(71) Applicant: Dexerials Corporation, Shinagawa-ku, Tokyo (JP)

(72) Inventors: Katsuhisa Orihara, Utsunomiya (JP); Masahiro Kobo, Yokohama (JP)

(73) Assignee: DEXERIALS CORPORATION, Shinagawa-ku, Tokyo (JP)

( * ) Notice: Subject to any disclaimer, the term of this patent is extended or adjusted under 35 U.S.C. 154(b) by 0 days.

(21) Appl. No.: 14/911,082

(22) PCT Filed: Aug. 6, 2014

(86) PCT No.: PCT/JP2014/070710
§ 371 (c)(1),
(2) Date: Feb. 9, 2016

(87) PCT Pub. No.: WO2015/029726
PCT Pub. Date: Mar. 5, 2015

(65) Prior Publication Data
US 2016/0205228 A1   Jul. 14, 2016

(30) Foreign Application Priority Data
Aug. 28, 2013   (JP) .................................. 2013-176812

(51) Int. Cl.
*H04M 1/02* (2006.01)
*H01Q 7/06* (2006.01)

(52) U.S. Cl.
CPC .............. *H04M 1/026* (2013.01); *H01Q 7/06* (2013.01)

(58) Field of Classification Search
CPC .......... H01Q 1/243; H01Q 1/248; H01Q 1/38; H01Q 1/40; H01Q 1/52; H01Q 7/00; H01Q 7/06; H04B 5/0093; H04M 1/026
See application file for complete search history.

(56) References Cited

U.S. PATENT DOCUMENTS

| 8,888,008 B2 * | 11/2014 | Teshima | G06K 19/0723 235/492 |
| 2008/0158848 A1 * | 7/2008 | Free | H05K 9/0075 361/818 |

(Continued)

FOREIGN PATENT DOCUMENTS

| JP | 2005-303541 A | 10/2005 |
| JP | 2012-130056 A | 7/2012 |
| WO | 2011/077877 A1 | 6/2011 |

OTHER PUBLICATIONS

Oct. 28, 2014, International Search Report issued in International Patent Application No. PCT/JP2014/070710.

(Continued)

*Primary Examiner* — David Bilodeau
(74) *Attorney, Agent, or Firm* — Kenja IP Law PC

(57) ABSTRACT

An electronic apparatus uses a smaller, thinner antenna module that does not have impairing communication characteristics and can also be mounted in a more narrow space. The electronic apparatus is provided with an antenna module including an antenna coil wound in a planar shape and a magnetic sheet overlapping at least a portion of the antenna coil. The antenna coil is bent, and from the bent portion, a plane that includes one side of the antenna coil on which current flows in one direction is disposed alongside a lateral face of an internal structure of a casing, and a plane that includes another side of the antenna coil on which current flows in the opposite direction than on the one side is disposed to overlap the magnetic sheet. The magnetic sheet is disposed at a position farther from a reader/writer than the other side of the antenna coil is.

5 Claims, 7 Drawing Sheets

(56) References Cited

U.S. PATENT DOCUMENTS

| | | | | |
|---|---|---|---|---|
| 2013/0126622 A1* | 5/2013 | Finn | ............... | G06K 19/07771 235/492 |
| 2013/0147675 A1* | 6/2013 | Kato | ............... | H01Q 1/38 343/788 |
| 2013/0271073 A1* | 10/2013 | Yang | ............... | H01F 5/00 320/108 |
| 2014/0091758 A1* | 4/2014 | Hidaka | ............... | H01F 38/14 320/108 |
| 2015/0249282 A1* | 9/2015 | Orihara | ............... | H01Q 1/243 343/702 |

OTHER PUBLICATIONS

Mar. 21, 2017, Notification of Reasons for Refusal issued by the Japan Patent Office in the corresponding Japanese Patent Application No. 2013-176812.

* cited by examiner

ELECTRONIC APPARATUS

TECHNICAL FIELD

This disclosure relates to an electronic apparatus having a built-in antenna module provided with a loop coil and a magnetic sheet. This application claims priority to and the benefit of Japanese Patent Application No. 2013-176812 filed Aug. 28, 2013, the entire contents of which are incorporated herein by reference.

BACKGROUND

In recent years, a plurality of RF antennas, such as an antenna for telephone communication, an antenna for GPS, an antenna for wireless LAN/BLUETOOTH®, and RFID (Radio Frequency Identification) have been mounted in wireless communication apparatuses. In addition to these antennas, a loop coil for transmitting power has also been provided as a result of the introduction of non-contact charging. Examples of a power transfer system used in a non-contact charging system include an electromagnetic induction system, a radio wave receiving system, and a magnetic resonance system. All of these systems make use of electromagnetic induction or magnetic resonance between a primary coil and a secondary coil. For example, Qi standards for non-contact charging or Near Field Communication (NFC) standards for RFID make use of electromagnetic induction.

Even if these antennas are designed for each antenna to obtain maximum characteristics at a target frequency, when the antennas are actually mounted in an electronic apparatus, it is difficult to obtain target characteristics. This is because magnetic field components around the antenna experience interference (are coupled) with metal and the like located nearby, and the inductance of the antenna coil is substantially reduced, thereby shifting the resonance frequency. Furthermore, the receiver sensitivity is lowered by the substantial reduction of the inductance. As a countermeasure against these problems, it is possible to reduce the interference due to metal by interposing a magnetic shield member formed by a magnetic material, such as ferrite, between the antenna coil and the metal located around the antenna coil, so that magnetic flux generated by the antenna coil converges on the magnetic shield member.

CITATION LIST

Patent Literature

PTL 1: JP 2005-303541 A

SUMMARY

Technical Problem

As a result of factors including the reduced size of electronic apparatuses such as mobile terminal devices, the increase in the number of components due to higher functionality, and the increase in battery capacity due to increase of power consumption, the space within the electronic apparatus casing that can be allocated for mounting the above-described antenna module has become very small. Therefore, there is growing demand for a smaller, thinner module in order to mount an antenna module for RFID and a charging module for non-contact charging in a more narrow space.

The loop antenna disclosed in JP 2005-303541 A (PTL 1) is disposed within a gap in the casing of a communication device such as a cellular telephone. Therefore, it is difficult for the antenna to have a fixed shape, and the amount of change in the inductance increases, leading to the problem of a large variation in the resonance frequency. In particular, when forming the antenna with a flexible cable, it is difficult to adjust the distributed capacity between wires, and a considerable number of man-hours is necessary to adjust the resonance frequency.

Therefore, it would be helpful to provide an electronic apparatus that uses an antenna module which is smaller and thinner without impairing the characteristics of the antenna module and which can also be mounted in a more narrow space.

Solution to Problem

In order to solve the above-described problem, an electronic apparatus according to this disclosure includes an antenna device incorporated into the electronic apparatus and configured to communicate with an external device via an electromagnetic field signal, the antenna device including a loop coil wound in a planar shape and a magnetic sheet formed from a magnetic material and overlapping at least a portion of the loop coil. The loop coil includes a bend, and from a position of the bend, a plane that includes one side of the loop coil on which current flows in one direction is disposed alongside a lateral face of an internal structure of a casing, and a plane that includes another side of the loop coil on which current flows in the opposite direction than on the one side is disposed to overlap the magnetic sheet. The magnetic sheet is disposed at a position farther from the external device than the other side of the loop coil is.

A portion or all of the internal structure of the casing of the electronic apparatus is preferably a metallic body.

Advantageous Effect

According to this disclosure, the antenna coil includes a bend, a plane that includes one side of the antenna coil is disposed alongside or in contact with a lateral face of an internal structure, and a plane that includes another side of the antenna coil is disposed to overlap the magnetic sheet. Therefore, the antenna module can be made thinner without impairing the communication characteristics of the antenna module and can also be mounted in a more narrow space.

Furthermore, according to this disclosure, by disposing the magnetic sheet alongside the lateral face of the internal structure that includes metal, a large amount of magnetic flux in a strong magnetic field area can be efficiently pulled in, thereby maintaining or improving the characteristics of the antennal module.

DETAILED DESCRIPTION

Figure 1:
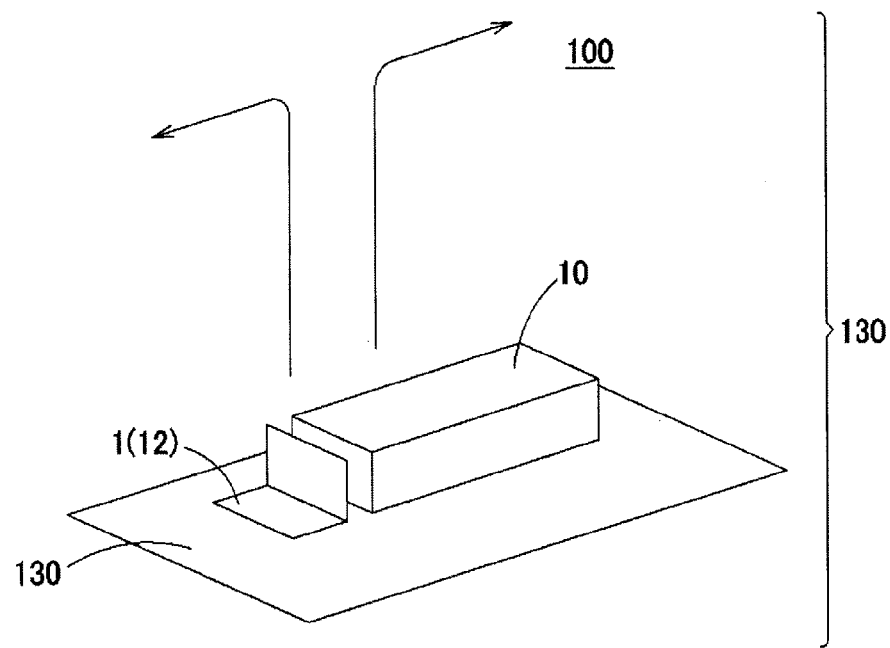
FIG. 1 is a perspective view schematically illustrating the structure of a wireless communication system using an electronic apparatus according to an embodiment to which this disclosure was applied.
Figure 1:
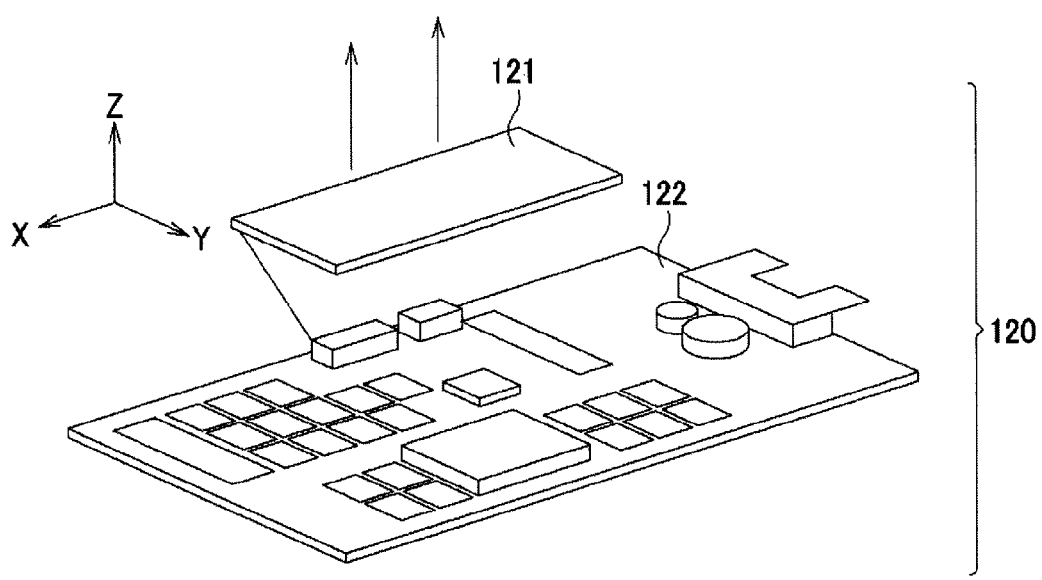

An electronic apparatus to which this disclosure was applied is described below in detail with reference to the drawings. It should be noted that this disclosure is not limited only to the following embodiments, and various modifications may of course be made without deviating from the scope of this disclosure. Moreover, the drawings are schematic, and the ratios of dimensions in the drawings may differ from the actual ratios. Specific dimensions and the like should be determined in light of the following description. Furthermore, the relationship between dimensions and the ratio thereof may of course differ between drawings.

[Near Field Communication System]

An antenna module 1 to which this disclosure is applied is incorporated in an electronic apparatus such as a cellular phone and achieves a near field communication function. Specifically, as illustrated in FIG. 1, the antenna module 1 to which this disclosure was applied is incorporated for example in a casing 131 of a cellular phone 130. The antenna module 1 is used as one of the constituent elements of a wireless communication system 100 for RFID.

In the wireless communication system 100, a reader/writer 120 accesses a communication processor incorporated with the antenna module 1 into the cellular phone 130. Here, the antenna module 1 and the reader/writer 120 are arranged so as to face each other in the xy-plane of a three-dimensional orthogonal xyz coordinate system.

The reader/writer 120 functions as a transmitter configured to transmit a magnetic field in the z-axis direction to the antenna coil 12 of the antenna module 1 facing the reader/writer 120 in the xy-plane. Specifically, the reader/writer 120 includes an antenna 121 configured to transmit a magnetic field to the antenna coil 12 and a control substrate 122 configured to communicate with the communication processor, which includes circuit elements such as a memory.

In other words, the reader/writer 120 is provided with the control substrate 122, which is electrically connected to the antenna 121. On this control substrate 122, a control circuit including one or a plurality of electronic parts, such as integrated circuit chips, is mounted. The control circuit performs various kinds of processing based on data received from a memory module via the antenna coil 12. For example, when transmitting data to the memory module, the control circuit encodes the data, modulates a carrier wave of a predetermined frequency (for example, 13.56 MHz) based on the encoded data, amplifies the modulated modulation signal, and drives the antenna 121 with the amplified modulation signal. Furthermore, when reading data out via the communication processor, the control circuit amplifies a modulation signal of data received by the antenna 121, demodulates the amplified data modulation signal, and decodes the demodulated data. The control circuit uses an encoding scheme and modulation scheme that are employed in common reader/writers, such as Manchester encoding and Amplitude Shift Keying (ASK) modulation or other known schemes.

The antenna coil 12 receives the magnetic field transmitted from the antenna 121 of the reader/writer 120 and inductively couples with the antenna 121, and the antenna module 1 provides signals to the memory, which is a storage medium incorporated in the cellular phone 130, and to the communication processor.

When receiving a magnetic field transmitted from the antenna 121 of the reader/writer 120, the antenna coil 12 is magnetically coupled to the antenna 121 by inductive coupling, thereby receiving a modulated electromagnetic wave and providing the received signal to the communication processor and the like.

The circuit elements, such as the memory and the communication processor, are driven by current flowing through the antenna coil 12 and communicate with the reader/writer 120. Specifically, the communication processor and the like demodulate a received modulation signal, decode the demodulated data, and write the decoded data to the internal memory. Furthermore, the communication processor reads out data, which are to be transmitted to the reader/writer 120, from the internal memory; encodes the read-out data; modulates a carrier wave based on the encoded data; and transmits the modulated wave to the reader/writer 120 via the antenna coil 12 magnetically coupled to the reader/writer 120 by inductive coupling.

The case of applying the antenna module 1 according to this disclosure to an antenna module for RFID has been described, but in addition to an antenna module for RFID, this disclosure may also be applied to an antenna module for non-contact charging, such as Qi, or to other antenna modules.

[Structure of Antenna Module and Electronic Apparatus]

Figure 2A:
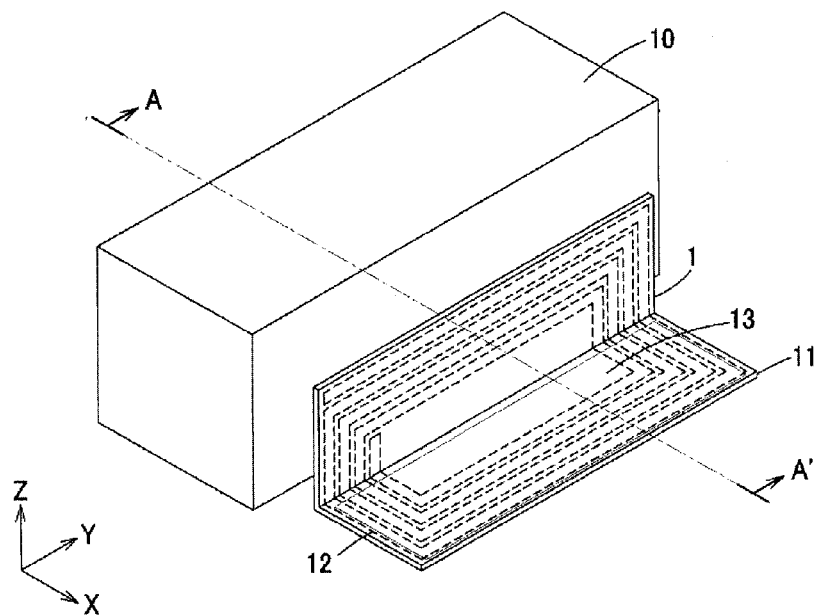
FIG. 2A is a perspective view.
Figure 2B:
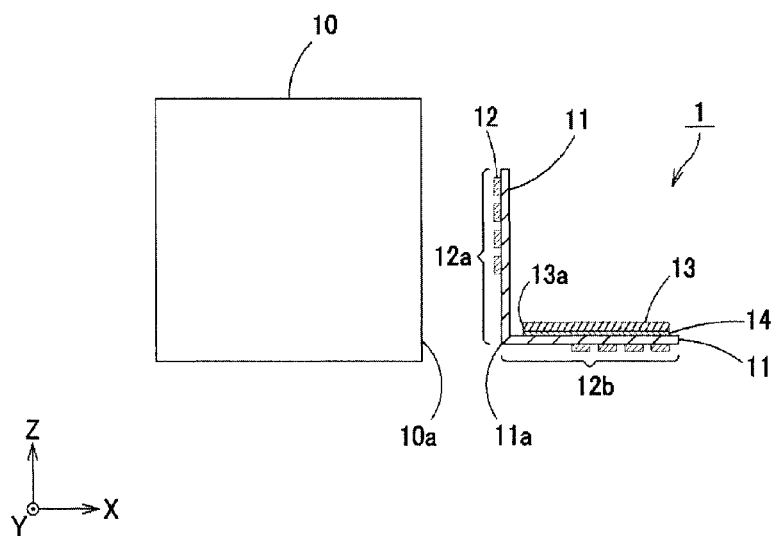
FIG. 2B is a cross-sectional diagram along the A-A' line in FIG. 2A, each illustrating an example of disposing an antenna module inside the casing of an electronic apparatus according to one of the embodiments of this disclosure.

As illustrated in FIGS. 2A and 2B, the antenna module 1 is an antenna for RFID, such as NFC, and includes a nearly rectangular antenna substrate 11, an antenna coil 12 formed in a spiral shape on one surface of the antenna substrate 11, and a magnetic sheet 13 disposed so as to partially overlap the antenna coil 12. The antenna coil 12 is bent along with the antenna substrate 11 at a bent portion 11a so as to have an approximately L-shaped cross-section. The bent portion 11a forms, for example, a straight line connecting the approximate center of the two opposing short sides of the rectangular antenna substrate 11. The antenna coil 12 and the antenna substrate 11 bent at the bent portion 11a are divided into one side 12a, on which current flows in the antenna coil 12 in one direction, and another side 12b, on which current flows in the antenna coil 12 in the opposite direction than on the one side 12a. For example, as illustrated in FIG. 2B, the side including one end of the antenna coil 12 and the antenna substrate 11 from the bent portion 11a is the one side 12a, and the side including the other end of the antenna coil 12 and the antenna substrate 11 from the bent portion 11a is the other side 12b. The magnetic field from the reader/writer 120 is transmitted in the positive direction along the z-axis in FIGS. 2A and 2B. The magnetic sheet 13 is disposed so as to overlap one surface of the other side 12b of the antenna coil 12, the surface being further from the facing surface of the reader/writer 120 than the antenna coil 12 is. The magnetic sheet 13 is preferably fixed to the antenna substrate 11 with an adhesive layer 14 formed from adhesive. The antenna coil 12 is formed on the surface of the antenna substrate 11 opposite from the magnetic sheet 13, since fixing the magnetic sheet to the antenna substrate 11 with the adhesive layer 14 therebetween is relatively easy. The antenna coil 12 may, of course, be formed instead on the opposite surface of the antenna substrate from FIG. 2B, with the adhesive layer 14 formed on the antenna coil 12 and the magnetic sheet 13 fixed thereto.

The antenna substrate 11 is an insulating base material and is preferably a flexible substrate formed by a flexible material such as polyimide, polyethylene terephthalate (PET), or the like.

The antenna coil 12 is formed by plating the antenna substrate 11 with a highly conductive metal material, such as Cu or Al, patterning, and then performing etching or the like to form spiral wiring.

The magnetic sheet 13 includes a sintered body of Ni—Zn-based ferrite. The magnetic sheet 13 is formed by sintering ferrite particles, applied in advance in a thin sheet shape, in a high temperature environment into a sheet and then cutting the sheet out into a predetermined shape. Alternatively, the magnetic sheet 13 may be formed by applying ferrite particles in a sheet shape that is the same as the final shape beforehand and sintering the ferrite particles. In addition, a predetermined shape of the magnetic sheet 13 may be obtained by stuffing ferrite particles into a mold having a rectangular cross-section, sintering the ferrite particles into a rectangular parallelepiped having a rectangular shape in plan view, and thinly slicing the sintered body.

The magnetic sheet 13 may include magnetic particles formed from soft magnetic powder and a resin that serves as a binder.

As the magnetic particles, particles of an oxide magnetic body such as ferrite; a crystal-based magnetic body or microcrystal-based magnetic body that is Fe-based, Co-based, Ni-based, Fe—Ni-based, Fe—Co-based, Fe—Al-based, Fe—Si-based, Fe—Si—Al-based, Fe—Ni—Si—Al-based, or the like, such as Sendust, permalloy, or the like; or an amorphous metal magnetic body that is Fe—Si—B-based, Fe—Si—B—C-based, Co—Si—B-based, Co—Zr-based, Co—Nb-based, Co—Ta-based, or the like may be used.

Of these materials, the aforementioned NiZn-based ferrite is preferably used as the magnetic material in the magnetic sheet 13 used in the antenna module for RFID such as NFC.

As the binder, a material such as a resin that is cured by heat, ultraviolet irradiation, or the like can be used. Examples of known materials that may be used as the binder include resins, such as epoxy resin, phenol resin, melamine resin, urea resin, and unsaturated polyester, and also include silicone rubber, urethane rubber, acrylic rubber, butyl rubber, and ethylene-propylene rubber. In the binder, an appropriate amount of a surface preparation agent such as a flame retardant, reaction conditioning agent, crosslinking agent, or silane coupling agent may be added to the aforementioned resin or rubber.

The magnetic sheet 13 is not limited to being formed of a single magnetic material and may also formed by mixing two or more types of magnetic materials, or by laminating into multiple layers. Even when the magnetic sheet 13 is formed of a single magnetic material, the magnetic sheet 13 may be formed by selecting and mixing a plurality of particle diameters and/or shapes of magnetic particles, or may be formed by laminating into multiple layers.

The magnetic sheet 13 is fixed on the antenna substrate 11 by adhesive. A widely known adhesive may be used to form the adhesive layer 14, or double-sided adhesive tape may of course be used instead of adhesive.

A plane including one side 12a of the loop antenna 12 is disposed alongside a lateral face 10a of an internal structure 10 disposed inside the electronic apparatus, such as a cellular phone or the like. The internal structure 10 is, for example, a battery pack that supplies the electronic apparatus with power to drive the electronic apparatus. In general, a battery pack has a metallic exterior package and functions as a magnetic shield that repels a magnetic field. A portion of the surface of the antenna module 1 is thus disposed alongside one of the faces of the internal structure 10 of the electronic apparatus, and the magnetic sheet 13 overlaps another surface of the antenna module 1, thereby causing the magnetic field to converge near the end of the magnetic sheet 13 and improving the communication characteristics of the antenna module 1.

Figure 3A:
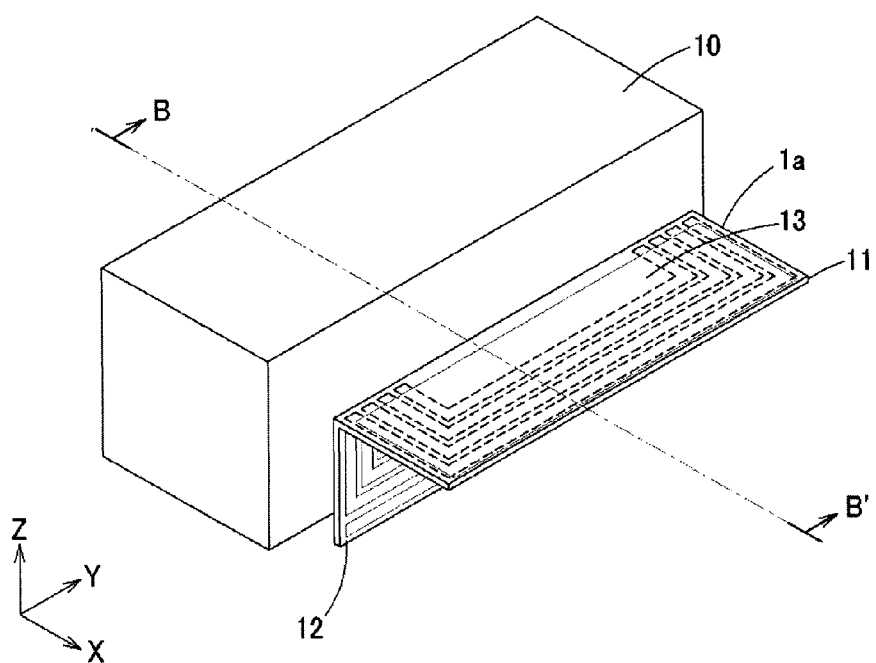
FIG. 3A is a perspective view.
Figure 3B:
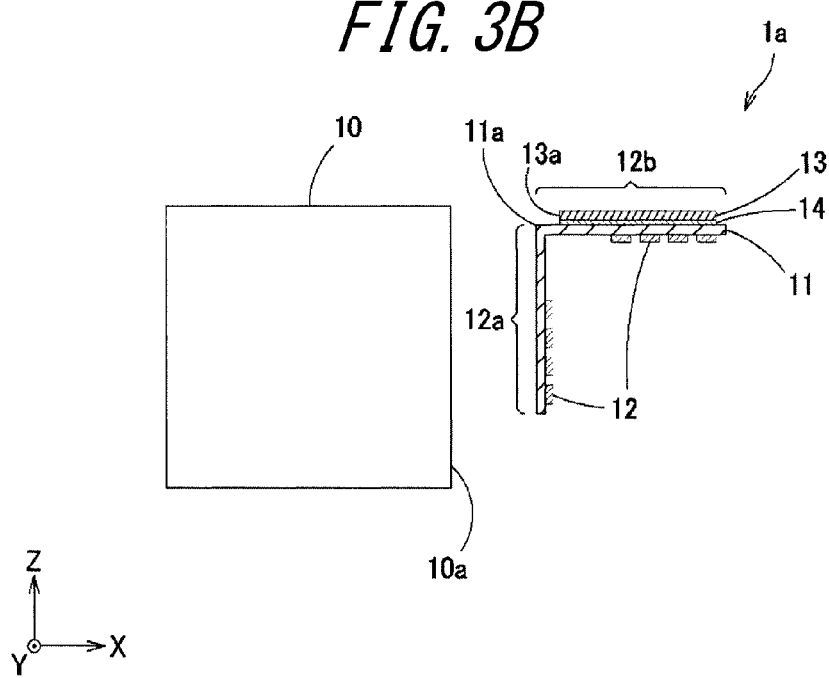
FIG. 3B is a cross-sectional diagram along the B-B' line in FIG. 3A, each illustrating an example of a modification for disposing an antenna module inside the casing of an electronic apparatus according to one of the embodiments of this disclosure.

As illustrated in FIGS. 3A and 3B, the bent portion 11a of the antenna substrate 11 and the antenna coil 12 may be moved away from the reader/writer 120. In other words, an antenna module 1a includes an antenna substrate 11 and an antenna coil 12 formed in a spiral shape that is wound around on the antenna substrate 11, and the antenna substrate 11 and antenna coil 12 are bent at a bent portion 11a positioned nearly at the center of the short side of the antenna substrate 11, so as to have an approximately L-shaped cross-section. A plane that includes one side 12a, from the bent portion 11a, on which current flows in the antenna coil 12 in one direction is disposed alongside the lateral face 10a of the internal structure 10, which is a parallelepiped, of the electronic apparatus. A plane that includes another side 12b, from the bent portion 11a, on which current flows in the antenna coil 12 in the opposite direction than on the one side 12a faces the reader/writer 120 so as to be nearly parallel to the plane of the antenna 121 of the reader/writer 120.

One surface of the antenna substrate 11 that includes the antenna coil 12 is not limited to being disposed alongside the lateral face 10a of the internal structure 10 as described above and may instead be disposed so as to contact the lateral face 10a physically. The lateral face 10a of the internal structure 10 need not be planar, as in the drawings, and may instead be a curved surface. The antenna substrate 11 may be bent alongside this curved surface or may be disposed alongside or in contact with a portion of the curved surface without being bent.

[Operating Principle]

Figure 4:
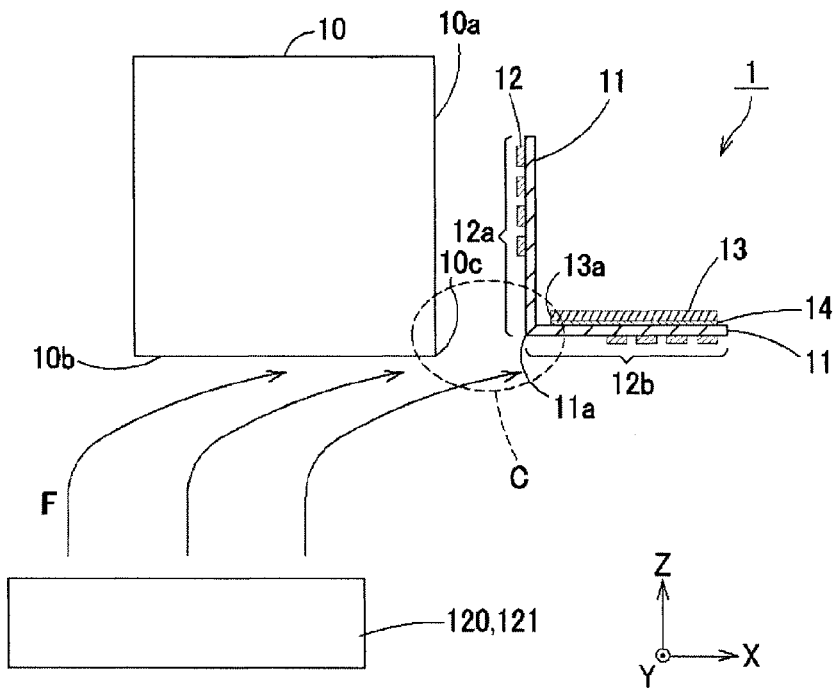
FIG. 4 is a cross-sectional diagram illustrating the operating principle of this disclosure in terms of the positional relationship between the antenna module and the internal structure in the casing of an electronic apparatus.

With reference to FIG. 4, the following describes the principle by which the communication characteristics of the antenna module improve in the electronic device according to an embodiment to which this disclosure was applied. As illustrated in FIG. 4, the structure of the electronic apparatus is similar to the structure described in FIGS. 2A and 2B. The reader/writer 120 and the antenna 121 of the reader/writer 120 are also clearly illustrated.

The electronic apparatus includes the antenna module 1 and the internal structure 10 such that a plane including one side 12a of the antenna coil 12 from the bent portion 11a of the antenna module 1 is disposed alongside the lateral face 10a. The antenna 121 of the reader/writer 120 is disposed in an xy-plane so as to face a main surface 10b of the internal structure 10 and the plane that includes the other side 12b of the antenna coil 12. The magnetic flux F of the magnetic field transmitted by the antenna 121 of the reader/writer 120 is emitted in a direction nearly perpendicular to the xy-plane, i.e. in the positive direction along the z-axis.

The internal structure 10 is typically a battery pack that is the power source for driving the electronic apparatus and is enclosed in a metallic case. The magnetic flux F due to the magnetic field transmitted by the antenna 121 of the reader/writer 120 flows to avoid the main surface 10*b* of the internal structure 10, as illustrated in FIG. 4, and flows towards the antenna module 1 disposed near the lateral face 10*a* of the internal structure 10. Accordingly, near the edge 10*c* of the internal structure 10, the magnetic flux density improves. Here, in the antenna module 1, the magnetic sheet 13 is disposed on the other side 12*b* of the antenna coil 12 that is disposed facing the reader/writer 120. The magnetic sheet 13 is disposed at a position that is farther from the antenna 121 of the reader/writer 120 than the antenna coil 12 is. Therefore, the magnetic flux F flows along the main surface 10*b* of the internal structure 10, and the magnetic flux density thereof improves. The magnetic flux density is thus increased by the magnetic sheet 13. In this way, the power induced in the antenna module 1 increases, improving the communication characteristics of the electronic apparatus.

[Modification]

In the above-described case, a plane including one side 12*a* of the antenna coil 12 is disposed alongside the lateral face 10*a* of the internal structure 10, and a plane including the other side 12*b* of the antenna coil 12 is disposed to face the antenna 121 of the reader/writer 120, i.e. to be nearly parallel to the plane of the antenna 121. As long as the above-described operating principle is obeyed, however, these positional relationships may of course be set freely.

Figure 5:
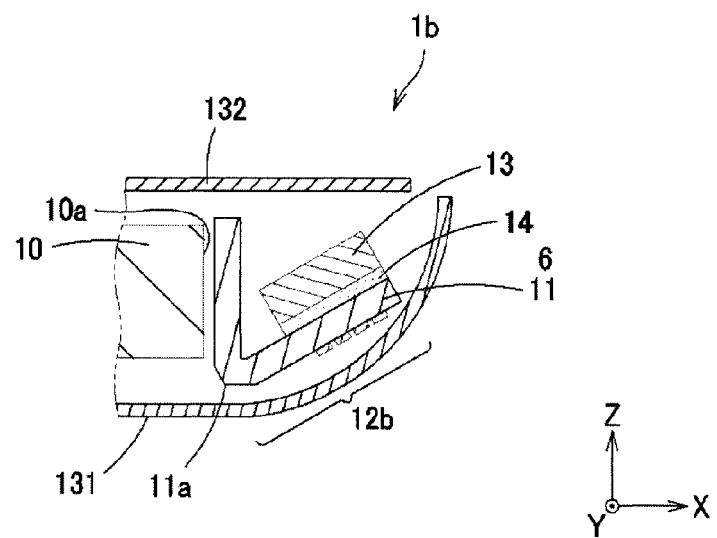
FIG. 5 is a cross-sectional diagram illustrating another modification for disposing an antenna module inside the casing of an electronic apparatus according to one of the embodiments of this disclosure.

As illustrated in FIG. 5, in an antenna module 1*b*, since the casing 131 of the cellular phone 130 curves, the angle of the bend in the bent portion 11*a* may be set to exceed 90°. Furthermore, the direction in which magnetic flux F flows depends on the placement relationship with the internal structure and the like inside the housing 131. Therefore, the bend may be set to a direction that optimizes the communication characteristics.

[Experiment on Communication Characteristics]

The communication characteristics of an antenna module in an electronic apparatus according to an embodiment to which this disclosure was applied were obtained by experiment. For the sake of comparison, the communication characteristics were obtained under the same conditions for a Reference Example representing the case of an electronic apparatus formed using an antenna module in which the antenna substrate and antenna coil were not bent. Specifically, the communication characteristics were calculated with a simulation to vary the coupling coefficient k when disposing an antenna module to face a reader/writer and displacing the reader/writer in the positive direction along the y-axis, as illustrated in FIGS. 6 and 7.

<Reference Example>

Figure 6:
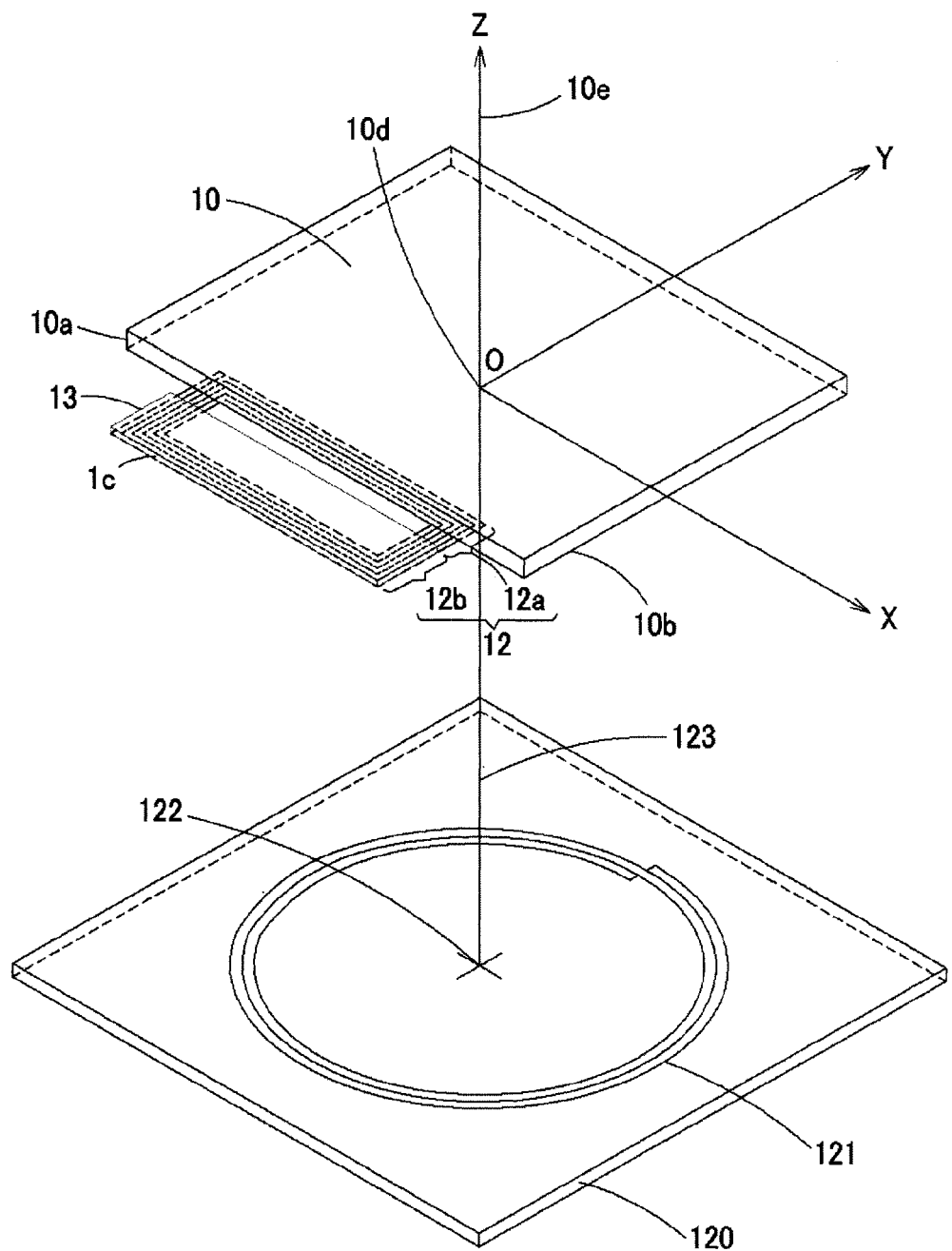
FIG. 6 is a perspective view illustrating the structure of a Reference Example.
Figure 7:
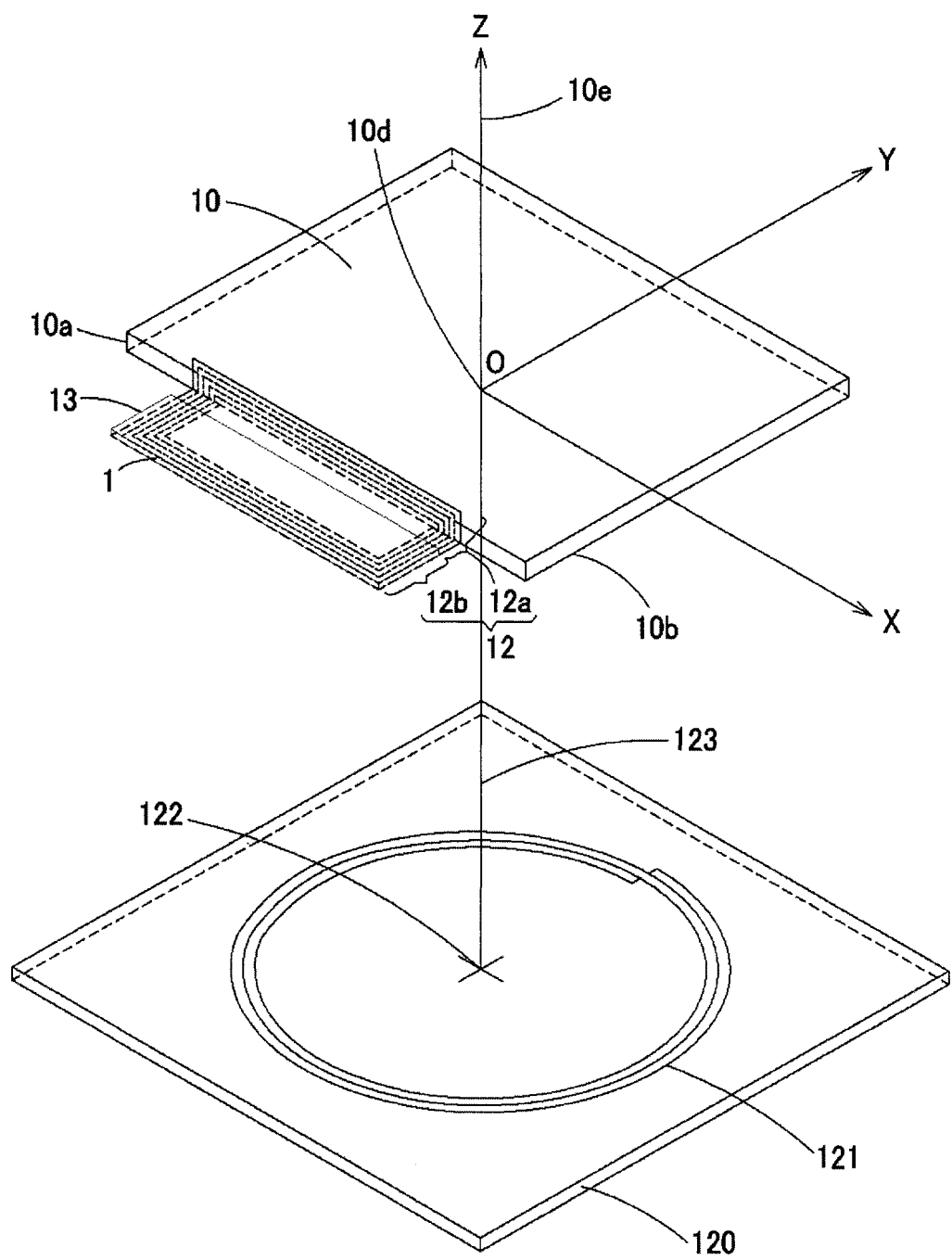
FIG. 7 is a perspective view illustrating the structure of an Example.

In the antenna module according to the reference example, as illustrated in FIG. 6, one side 12*a* of an antenna module 1*c* not overlapped by the magnetic sheet 13 was overlapped with a main surface 10*b* of a metallic battery case as the internal structure 10, the antenna module 1*c* and the antenna 121 of the reader/writer 120 were disposed to face each other, and the communication characteristics when varying the relative positional relationship between the antenna 121 and the antenna module 1*c* were evaluated.

The specific evaluation conditions were as follows. The antenna 121 of the reader/writer 120 had an outside diameter in the xy-plane of 70 mm and was a two-turn loop coil with a pitch of 1.5 mm. The internal structure 10 was an aluminum block with dimensions of 60 mm×50 mm×5 mm as prescribed along the xyz-axes. The antenna coil 12 of the antenna module 1*c* had an outer shape of 50 mm×40 mm as prescribed along the xy-axes and was a four-turn loop coil with a pitch of 1 mm. The magnetic sheet 13 disposed on the other side 12*b* of the antenna module 1*c* was a 0.2 mm thick ferrite sheet with a relative magnetic permeability of 120, covered with a protective film and adhered to the antenna module 1*c* by an adhesive layer 14.

The distance between the main surface 10*b* of the internal structure 10 and the antenna coil 12 was 0.5 mm. Furthermore, the distance from the antenna 121 of the reader/writer 120 to the antenna coil 12 as prescribed along the z-axis was 40 mm.

As a value indicating the relative positional relationship between the antenna 121 of the reader/writer 120 and the antenna coil 12, an offset a was used. In other words, assuming an axis line 123 along the z-axis passing through the center 122 of the antenna 121 of the reader/writer 120 and an axis line 10*e* along the z-axis passing through the center (O) 10*d* of the internal structure 10, the offset a was the distance between the axis lines 123 and 10*e* when displacing the reader/writer 120 in the positive direction along the y-axis in FIG. 6 from a position in which the axis lines 123 and 10*e* matched.

Figure 8:
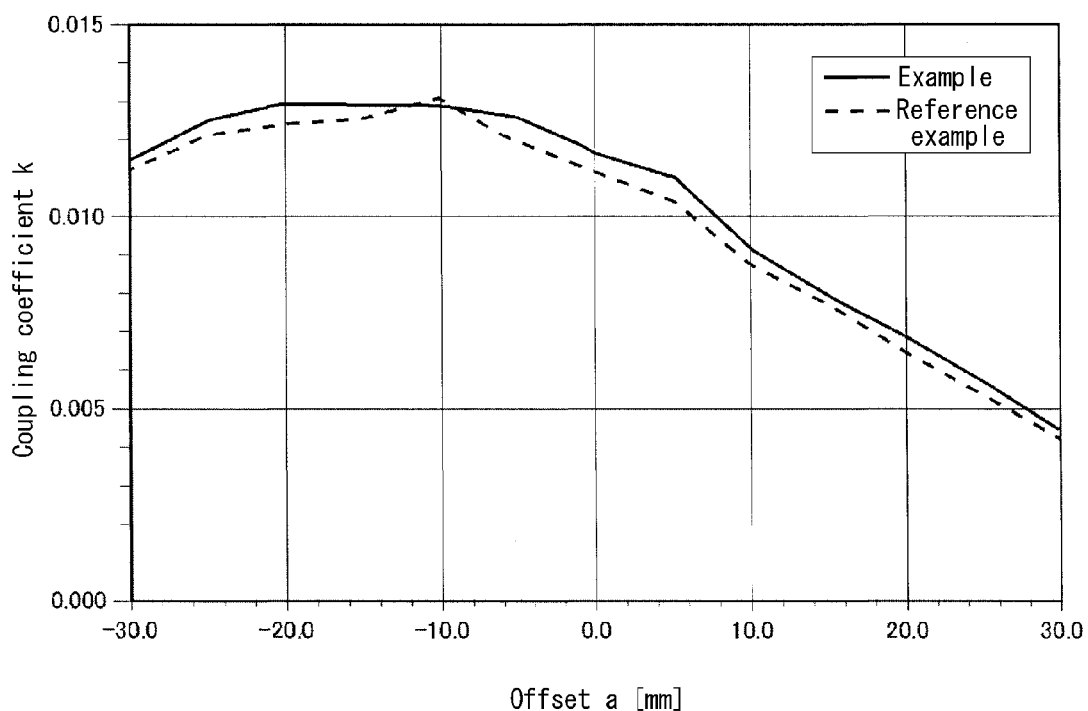
FIG. 8 is a graph illustrating the relationship between the coupling coefficient and the displacement distance from the center of the reader/writer for the Example and the Reference Example.

Under the above-described conditions, the coupling coefficient k of the antenna coil 12 was calculated by simulation when varying the value of a from −30 mm to 30 mm. FIG. 8 illustrates the change in the coupling coefficient k.

EXAMPLE

In this Example, as illustrated in FIG. 7, an antenna module 1 in which a plane including one side 12*a* of the antenna coil 12 was disposed alongside the lateral face 10*a* of the internal structure 10 was used. The magnetic sheet 13 was attached to the other side 12*b* of the antenna coil 12. Like the Reference Example of FIG. 6, the antenna module 1 and the reader/writer 120 were disposed to face each other, and the communication characteristics when varying the relative positional relationship between the reader/writer 120 and the antenna module 1 were evaluated.

The specific evaluation conditions were the same as the above-described Reference Example with regard to the reader/writer 120, the internal structure 10, and the distance from the antenna 121 of the reader/writer 120 to the antenna coil 12. In the antenna module 1 of the Example, an antenna module that was the same as the antenna module 1*c* of the Reference Example except for being bent at nearly the center of the short sides (40 mm) was used.

Under the above-described conditions, the coupling coefficient k of the antenna coil 12 was calculated by simulation when varying the value of a from −30 mm to 30 mm. FIG. 8 illustrates the change in the coupling coefficient k along with the plot of the Reference Example.

The coupling coefficient k was shown to be equivalent when using either the antenna module 1 of the Example or the antenna module 1*c* of the Reference Example.

In other words, by using the antenna module 1 of the Example and disposing the plane including one side 12*a* of the antenna coil 12 alongside the lateral face 10*a* of the internal structure 10, the communication characteristics were maintained. Therefore, it is possible to provide an electronic apparatus using an antenna module that can be made thinner in the thickness direction of the battery case (internal structure 10) without impairing the characteristics of the antenna module and that can also be mounted in a more narrow space. Furthermore, an internal structure such as a battery case may in some cases be removable from the casing of the electronic apparatus. When the plane including one side 12*a* of the antenna module 1 is disposed alongside the lateral face of the internal structure 10 without being in contact, the antenna module 1 can be prevented from blocking the release of the internal structure 10.

REFERENCE SIGNS LIST

1, 1*a*,1*b*, 1*c* Antenna module
10 Internal structure
10*a* Lateral face
10*b* Main surface
10*c* Edge
11 Antenna substrate
11*a* Bent portion
12 Antenna coil
12*a* One side
12*b* Another side (the other side)
13 Magnetic sheet
13*a* Edge
14 Adhesive layer
120 Reader/writer
121 Antenna
130 Cellular phone
131 Casing

The invention claimed is:

1. An electronic apparatus comprising:
an antenna device incorporated into the electronic apparatus and configured to communicate with an external device via an electromagnetic field signal, the antenna device comprising a loop coil wound in a planar shape and a magnetic sheet formed from a magnetic material and overlapping at least a portion of the loop coil,
wherein the loop coil includes a bend, and from a position of the bend, a plane that includes one side of the loop coil on which current flows in one direction is disposed alongside a lateral face of an internal structure disposed inside a casing, and a plane that includes another side of the loop coil on which current flows in the opposite direction than on the one side is disposed to overlap the magnetic sheet, and
wherein the magnetic sheet is disposed at a position farther from the external device than the another side of the loop coil is,
of the one side and the another side of the loop coil, only the one side of the loop coil is disposed near to and is disposed so as to face the lateral face of the internal structure, and
the another side of the loop coil is extended from the position of the bend away from the internal structure.

2. The electronic apparatus of claim 1, wherein a portion or all of the internal structure is a metallic body.

3. The electronic apparatus of claim 1, wherein the another side of the loop coil is bent at a predetermined angle from a plane facing the external device.

4. The electronic apparatus of claim 2, wherein the another side of the loop coil is bent at a predetermined angle from a plane facing the external device.

5. The electronic apparatus of claim 1, wherein the another side of the loop coil is arranged so as to face the casing.

* * * * *